(12) United States Patent
Okamoto et al.

(10) Patent No.: US 9,291,364 B2
(45) Date of Patent: Mar. 22, 2016

(54) COMBUSTION APPARATUS

(75) Inventors: Shinichi Okamoto, Hyogo (JP); Masato Doyama, Hyogo (JP)

(73) Assignee: NORITZ CORPORATION (JP)

(\*) Notice: Subject to any disclaimer, the term of this patent is extended or adjusted under 35 U.S.C. 154(b) by 293 days.

(21) Appl. No.: 13/554,521

(22) Filed: Jul. 20, 2012

(65) Prior Publication Data

US 2013/0025546 A1 Jan. 31, 2013

(30) Foreign Application Priority Data

Jul. 28, 2011 (JP) .................. 2011-166028

(51) Int. Cl.
| | |
|---|---|
| F24H 8/00 | (2006.01) |
| F24H 1/20 | (2006.01) |
| F24H 9/20 | (2006.01) |
| F24H 1/46 | (2006.01) |
| F23N 1/00 | (2006.01) |
| F23N 5/00 | (2006.01) |

(52) U.S. Cl.
CPC *F24H 8/00* (2013.01); *F23N 1/002* (2013.01); *F23N 5/003* (2013.01); *F24H 1/205* (2013.01); *F24H 1/46* (2013.01); *F24H 8/006* (2013.01); *F24H 9/20* (2013.01); *F24H 9/2035* (2013.01); *F23N 2025/10* (2013.01); *F23N 2037/02* (2013.01); *F23N 2037/10* (2013.01); *Y02B 30/102* (2013.01); *Y02B 30/106* (2013.01)

(58) Field of Classification Search
CPC .................................. F24H 1/205; F24H 9/20
USPC ............. 122/14.21; 432/19, 179; 236/15 BB, 236/15 BR
See application file for complete search history.

(56) References Cited

U.S. PATENT DOCUMENTS

| | | | | |
|---|---|---|---|---|
| 3,266,725 | A * | 8/1966 | Garrison et al. | 236/15 R |
| 4,252,300 | A * | 2/1981 | Herder | 266/144 |
| 4,459,923 | A * | 7/1984 | Lewis | 110/346 |
| 5,630,714 | A * | 5/1997 | Yuino et al. | 432/36 |
| 5,667,375 | A * | 9/1997 | Sebastiani | 431/12 |
| 6,606,968 | B2 * | 8/2003 | Iwama et al. | 122/18.1 |
| 7,322,532 | B2 * | 1/2008 | Takada et al. | 236/11 |
| 7,494,337 | B2 * | 2/2009 | Specht et al. | 431/283 |

(Continued)

FOREIGN PATENT DOCUMENTS

| | | |
|---|---|---|
| JP | 08-270936 A | 10/1996 |
| JP | 11-211081 A | 8/1999 |

*Primary Examiner* — Steven B McAllister
*Assistant Examiner* — Rabeeul Zuberi
(74) *Attorney, Agent, or Firm* — Fishman Stewart Yamaguchi PLLC

(57) ABSTRACT

According to the required amount of heating, a controller of a combustion apparatus exercises selective on-off switching control on capacity control switching valves for the supplying of gas to three different combustion areas partitioned respectively by a group of three combustion burners, a group of five combustion burners and a group of nine combustion burners, whereby the three combustion areas can selectively be burned, thereby the combustion capacity is changed and switched to any of a plurality of combustion capacity levels. A combustion exhaust temperature sensor is disposed in the vicinity of the inlet of an exhaust stack. Judgment temperatures corresponding respectively to combustion capacity levels for combustion exhaust high-temperature abnormality judgment are set. If the detected combustion exhaust temperature exceeds the judgment temperature corresponding to a current combustion capacity level, this provides a notification indicative of the occurrence of an abnormality while combustion is forcibly stopped.

1 Claim, 6 Drawing Sheets

(56) References Cited

U.S. PATENT DOCUMENTS

| | | | |
|---|---|---|---|
| 7,597,066 B2 * | 10/2009 | Shimada et al. | 122/18.1 |
| 7,628,123 B2 * | 12/2009 | Inami et al. | 122/448.3 |
| 8,267,051 B2 * | 9/2012 | Ando | 122/18.1 |
| 8,695,539 B2 * | 4/2014 | Iwama et al. | 122/31.1 |
| 2008/0318172 A1 * | 12/2008 | Geiger et al. | 431/12 |
| 2009/0025655 A1 * | 1/2009 | Tanaka et al. | 122/14.21 |
| 2009/0151654 A1 * | 6/2009 | Ando | 122/19.2 |

\* cited by examiner

Fig. 4

| COMBUSTION CAPACITY LEVEL | NUMBER OF COMBUSTION BURNERS | SWITCHING OF CAPACITY CONTROL SWITCHING VALVES | | | JUDGMENT TEMPERATURE (°C) |
|---|---|---|---|---|---|
| | | SV1 | SV2 | SV3 | |
| LEVEL 1 | 3 | OPEN | CLOSE | CLOSE | 78 |
| LEVEL 2 | 5 | CLOSE | OPEN | CLOSE | 74 |
| LEVEL 3 | 8 | OPEN | OPEN | CLOSE | 76 |
| LEVEL 4 | 12 | OPEN | CLOSE | OPEN | 76 |
| LEVEL 5 | 17 | OPEN | OPEN | OPEN | 72 |

COMBUSTION APPARATUS

TECHNICAL FIELD

The present invention generally relates to combustion apparatuses. The present invention is intended in particular for a combustion apparatus which is provided with a plurality of combustion areas and whose combustion capacity is switchable to any of a plurality of levels ranging from low to high in combustion capacity. The present invention is concerned with combustion control technology based on the monitoring of the temperature of combustion exhaust in a combustion apparatus of the aforesaid type.

BACKGROUND ART

Heretofore, there has been proposed a technology that determines whether or not the combustion apparatus is in a normal combustion mode according to whether or not the detected combustion exhaust temperature falls within the range between the upper and the lower limits found by calculation (see, for example, Patent Literature 1). In addition, there has been proposed another technology that determines whether or not to perform a safety operation for preventing the exhaust duct from firing according to whether or not the combustion exhaust temperature, detected midway during directing of the flow of combustion exhaust from the exhaust hood of the combustion appliance to the main duct channel through which combustion exhaust is discharged to the outside, falls within the predefined allowable combustion exhaust temperature range (see, for example, Patent Literature 2).

CITATION LIST

Patent Literature

Patent Literature 1: JP-A-H08-270936
Patent Literature 2: JP-A-H11-211081 (Japanese Patent No. 3908373)

SUMMARY OF INVENTION

Technical Problem

However, in the case where the change in combustion capacity is made by combustion-area changing/switching, it is conceivable that the following problems will arise due to the fact that, in addition to burned combustion exhaust from a combustion area, unburned air (no-effect air) from an unburned area flows towards the exhaust side. In other words, in such a case, the unburned air diminishes the detected value of the temperature of combustion exhaust and, in addition, even when combustion is provided at the same combustion amount on the whole of the combustion apparatus, the combustion exhaust temperature detected will differ depending on which of the combustion areas is to be burned. Therefore, even if either the judgment temperature or the judgment temperature range is set uniformly for each combustion apparatus whereby to perform various control operations by comparison between either the judgment temperature or the judgment temperature range and the detected combustion exhaust temperature, the result may not meet practical requirements. As a result of this, although combustion is provided in a normal combustion mode, the judgment is erroneously made that abnormal combustion is occurring, thereby resulting either in execution of a control operation that brings the combustion to a stop or in execution of a control operation that forcibly reduces the amount of gas to be supplied (i.e., the input gas amount). This will cause degradation in usability and will further cause a delay in heating-up of water.

Therefore, the technical problem with those that are configured such that the change in combustion capacity is made by selective combustion switching between a plurality combustion areas is that the safety control based on the detection of the temperature of combustion exhaust is performed adequately in response to an actual combustion condition associated with combustion-capacity changing/switching.

Solution to Problem

There is provided a combustion apparatus that the present invention is intended for. The combustion apparatus of the present invention is a combustion apparatus of the type comprising a plurality of partitioned combustion areas. Each of the combustion areas is formed of a single combustion burner or of a plurality of combustion burners arranged in parallel. These combustion areas are selectively burned, whereby the combustion capacity of the combustion apparatus is made capable of being changed and switched to any of a plurality of combustion capacity levels. And, the combustion apparatus of the present invention has the following characteristic particulars. That is, the combustion apparatus of the present invention is provided with (a) a combustion exhaust temperature sensor for detection of the temperature of combustion exhaust and (b) a control means for monitoring of the combustion exhaust temperature detected by the combustion exhaust temperature sensor whereby to perform a safety process if the detected combustion exhaust temperature exceeds a judgment temperature for high-temperature abnormality judgment. And, the control means is provided, as a judgment temperature for high-temperature abnormality judgment, with judgment temperatures that are set so as to correspond respectively to the combustion capacity levels whereby the safety process is performed based on a judgment temperature corresponding to a current combustion capacity level.

In accordance with the combustion apparatus of the present invention, various judgment temperatures corresponding, respectively, to the combustion capacity levels are employed as a judgment temperature for high-temperature abnormality judgment based on which to perform a safety process and, therefore, if the combustion capacity level differs even when the amount of combustion is the same, then, correspondingly thereto, there is used a different judgment temperature. This makes it possible to exercise control that is suitable for the actual combustion condition, whereby it becomes possible to not only make a high-temperature abnormality judgment more conforming, especially, to an actual combustion condition for each combustion capacity level, but also realize execution of a safety process based on the high-temperature abnormality judgment. Therefore, the combustion apparatus of the present invention is capable of preventing the occurrence of such a condition that heating-up of water to a predetermined temperature is delayed by forced reduction in the amount of combustion although actually no high-temperature abnormality is occurring, whereby it becomes possible to more promptly achieve heating-up of water to a predetermined temperature, in comparison with the case where comparison with a detected combustion exhaust temperature is made using a single judgment temperature whereby to perform, without regard to the combustion condition at any one of the combustion capacity levels, a safety process to uniformly reduce the amount of combustion whenever the detected combustion exhaust temperature is in excess of the single judgment temperature. Alternatively, in comparison with the case where, as a substitute for the forced combustion amount reduction, combustion is forcibly stopped as a safety process, the combustion apparatus of the present invention is able to prevent the occurrence of such a condition that there is made an erroneous judgment informing that the state has entered into a high-temperature abnormality state in spite of the actual condition that the combustion can still be continued under a current combustion state.

In addition, the following advantageous effects can be accomplished by such arrangement that the combustion apparatus of the present invention is configured in the form of a latent heat recovery type water heater equipped with a latent heat recovery heat exchanger for recovery of latent heat from combustion exhaust while the combustion exhaust temperature sensor is disposed so as to detect the temperature of post-latent heat recovery combustion exhaust past the latent heat recovery heat exchanger. That is, it becomes possible to perform an adequate safety process in response to the actual condition of the temperature of combustion exhaust, especially in a latent heat recovery type water heater characterized in that, after latent heat recovery by the latent heat recovery heat exchanger, the temperature of combustion exhaust decreases down to a relatively low-temperature zone, that is, the combustion exhaust temperature easily becomes under the influence of the difference in combustion capacity level.

Furthermore, by such arrangement that the combustion apparatus is provided with an exhaust stack therethrough for passage of post-latent heat recovery combustion exhaust past the latent heat recovery heat exchanger, that the exhaust stack is connected, by in-situ mounting, to an outer exhaust stack formed as a separate body from the exhaust stack and not composing the combustion apparatus and that the combustion exhaust temperature sensor is disposed in the exhaust stack, it becomes possible to obtain the following advantageous effects. That is, even in the case where there is need to prevent the outer exhaust stack from degradation in thermal durability when the outer exhaust stack is formed using a pipe of synthetic resin such as heat resistant vinyl chloride, it becomes possible to adequately protect the outer exhaust stack as a target for protection with the aid of the combustion exhaust temperature sensor disposed in the exhaust stack. This is because, without having to dispose the combustion exhaust temperature sensor directly to the outer exhaust stack, it is possible to know, by means of calculation, test or the like, the correlation between the temperature of combustion exhaust detected by the combustion exhaust temperature sensor disposed in the exhaust stack and the heat due to the influence of combustion exhaust which will extend to the outer exhaust stack at the time of detection of the temperature of combustion exhaust. And, based on this, there is set a judgment temperature with respect to the temperature of combustion exhaust detected by the combustion exhaust temperature sensor, whereby it becomes possible to monitor the condition of the temperature of combustion exhaust in contact with the outer exhaust stack as a target for protection with the aid of the combustion exhaust temperature sensor disposed in a different location, i.e., in the exhaust stack, from the outer exhaust stack to be protected. This makes it possible to adequately protect the outer exhaust stack.

BRIEF DESCRIPTION OF DRAWINGS

In the drawing:

FIG. 4 is a table representing, in an example of the combustion capacity changing/switching combination, an example in which judgment temperatures for the temperature of combustion exhaust are set respectively for combustion capacity levels;

FIG. 5, comprised of FIGS. 5(a), (b), (c), shows an example of the combustion condition for each of switching levels of the combustion capacity, wherein FIG. 5(a) is an example of the combustion capacity of Level 1, FIG. 5 (b) is an example of the combustion capacity of Level 2 and FIG. 5(c) is an example of the combustion capacity of Level 3; and FIG. 6, comprised of FIGS. 6(a), (b), is similar to FIG. 5, wherein FIG. 6(a) is an example of the combustion capacity of Level 4 and FIG. 6(b) is an example of the combustion capacity of Level 5.

DESCRIPTION OF EMBODIMENTS

Figure 1:
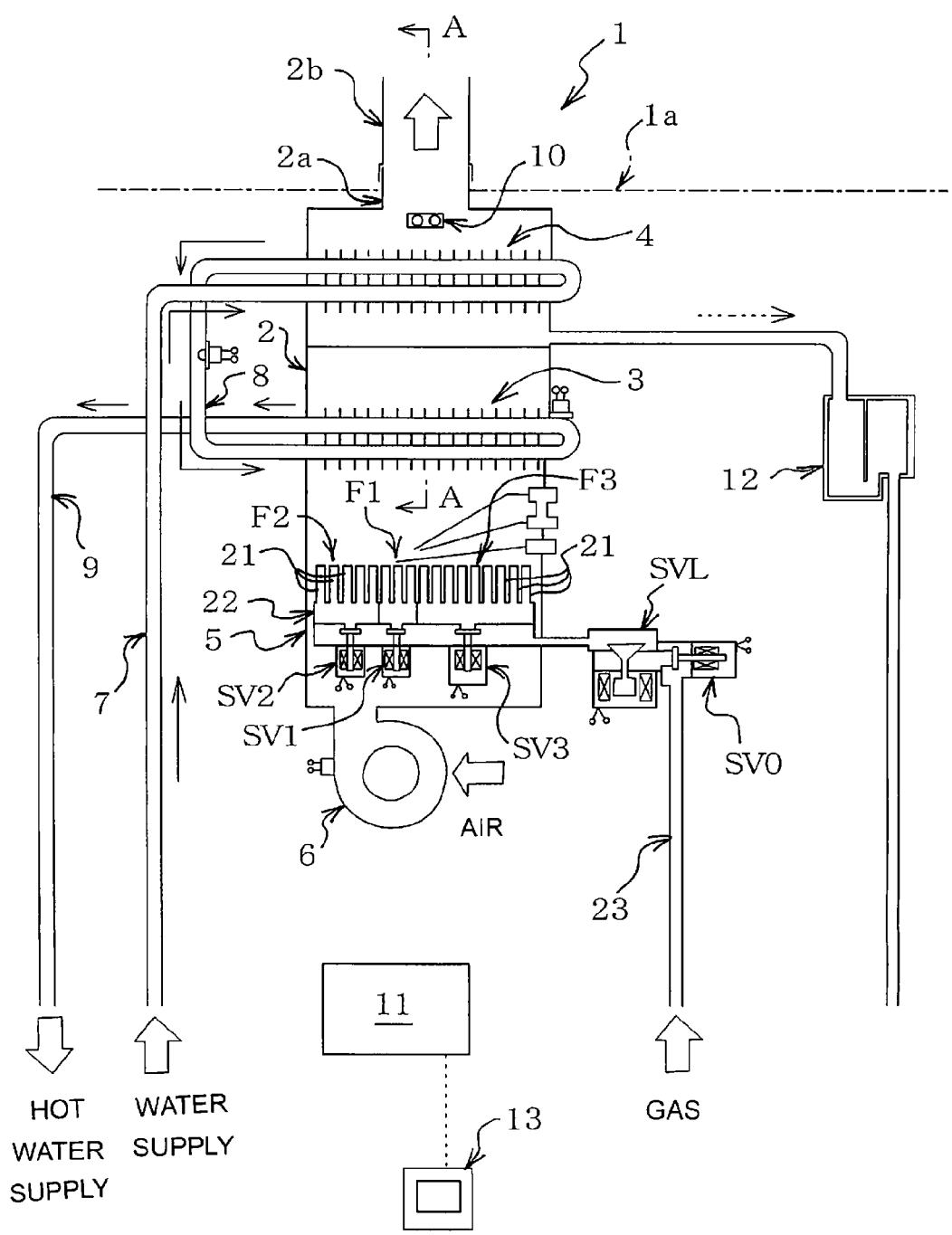
FIG. 1 is a schematic diagram when a combustion apparatus of the present invention is applied to a latent heat recovery type water heater.

Hereinafter, embodiments of the present invention will be described with reference to the drawing figures.

Figure 2:
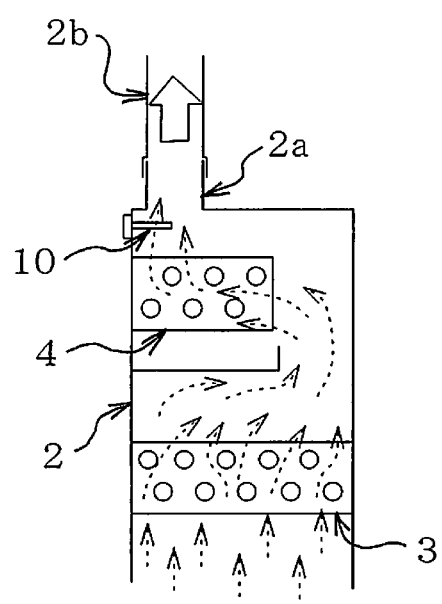
FIG. 2 is a cross-sectional explanatory diagram taken along line A-A of FIG. 1.

FIGS. 1, 2 show a combustion apparatus according to an embodiment of the present invention. The combustion apparatus shown in FIGS. 1, 2 is configured in the form of a latent heat recovery type water heater. The combustion apparatus of the present embodiment has a plurality of combustion areas (three combustion areas are shown by way of example in the figure), and by the arrangement that each combustion area is selectively individually burned or by the arrangement that each combustion area is burned in selective combination with the other, the combustion capacity can be changed and switched to any of a plurality of combustion capacity levels (five combustion capacity levels in the present embodiment). In addition, what is meant by "latent heat recovery type" is a type which is configured to recover, in addition to the recovery of sensible heat from the combustion exhaust, latent heat from the combustion exhaust to thereby accomplish high efficiency and which is equipped with at least a secondary heat exchanger 4 for latent heat recovery. In addition, FIG. 1 shows a latent heat recovery type water heater 1 of the mono-function type (only a hot water supply function), which, however, should not be considered as limitations. For example, it is possible to apply the present invention to a water heater of the composite type provided, in addition to a hot water supply function, with any one or more of a hot water circulating type air heating function, a bath water reheating function and an automatic bath hot water filling function.

A housing 1a accommodates therein a combustor casing 2. Arranged in the combustor casing 2 are a primary heat exchanger 3 for sensible heat recovery, a secondary heat exchanger 4 for latent heat recovery and a combustion heating section 5 for application of combustion heat to these heat exchangers 3, 4. There is provided under the combustor casing 2 a blast fan 6 which is rotatably driven by a fan motor to thereby provide the supply of combustion air to the combustion heating section 5. It is arranged that water to be heated is first passed into the tube of the secondary heat exchanger 4 and then passed into the tube of the primary heat exchanger 3. At this time, combustion exhaust first flows through the primary heat exchanger 3 by the combustion operation of the combustion heating section 5 wherein, by the exchange of heat between combustion exhaust in contact with the outside of the tube of the primary heat exchanger 3 and water present inside the tube of the primary heat exchanger 3, sensible heat is recovered from the combustion exhaust, and water is heated up to a predefined set temperature in the primary heat exchanger 3 by sensible heat recovery from the combustion exhaust. Next, after having been passed upward through the primary heat exchanger 3, the combustion exhaust is flowed towards the rear side of the combustor casing 2 (the far side in a direction orthogonal to the plane of paper of FIG. 1; see dotted arrows in FIG. 2) and then flows through the secondary heat exchanger 4 towards the front side from the rear side. In the secondary heat exchanger 4, by the exchange of heat between combustion exhaust passing outside the tube of the secondary heat exchanger 4 and water present inside the secondary heat exchanger 4, latent heat is recovered from the combustion exhaust. By this recovery of latent heat from the combustion exhaust, water is preheated before being subjected to heating in the primary heat exchanger 3. On the other hand, after having been passed through the secondary heat exchanger 4, the combustion exhaust is discharged, through an exhaust stack 2a and then through an outer exhaust stack 2b connected to the exhaust stack 2a, to the outside of the combustion apparatus.

There is provided in the vicinity of the base of the exhaust stack 2a a combustion exhaust temperature sensor 10. The combustion exhaust temperature sensor 10 is configured to detect the temperature of combustion exhaust past the secondary heat exchanger 4 at the time when it (the combustion exhaust) flows into the exhaust stack 2a, and the combustion exhaust temperature thus detected is output to a controller 11 which will be described hereinafter. The exhaust stack 2a as described above is a part of the combustor casing 2 constituting the combustion apparatus and is factory-manufactured, while on the other hand the outer exhaust stack 2b, made of a predetermined material as a separate body, is connected to the exhaust stack 2a by in-situ mounting in the installation field of the combustion apparatus. Because of this, the combustion exhaust temperature sensor 10 is assembled to the factory-manufactured combustor casing 2 in the factory.

In addition, as the primary heat exchanger 3 and the secondary heat exchanger 4, a fin and tube type heat exchanger made up of a large number of fins and tubes passing completely through these fins is shown by way of example. However, heat exchangers other than the fin and tube type can be used as primary and secondary heat exchangers as long as they are able to effect heat exchange by contact with either combustion gas or exhaust gas.

Figure 3:
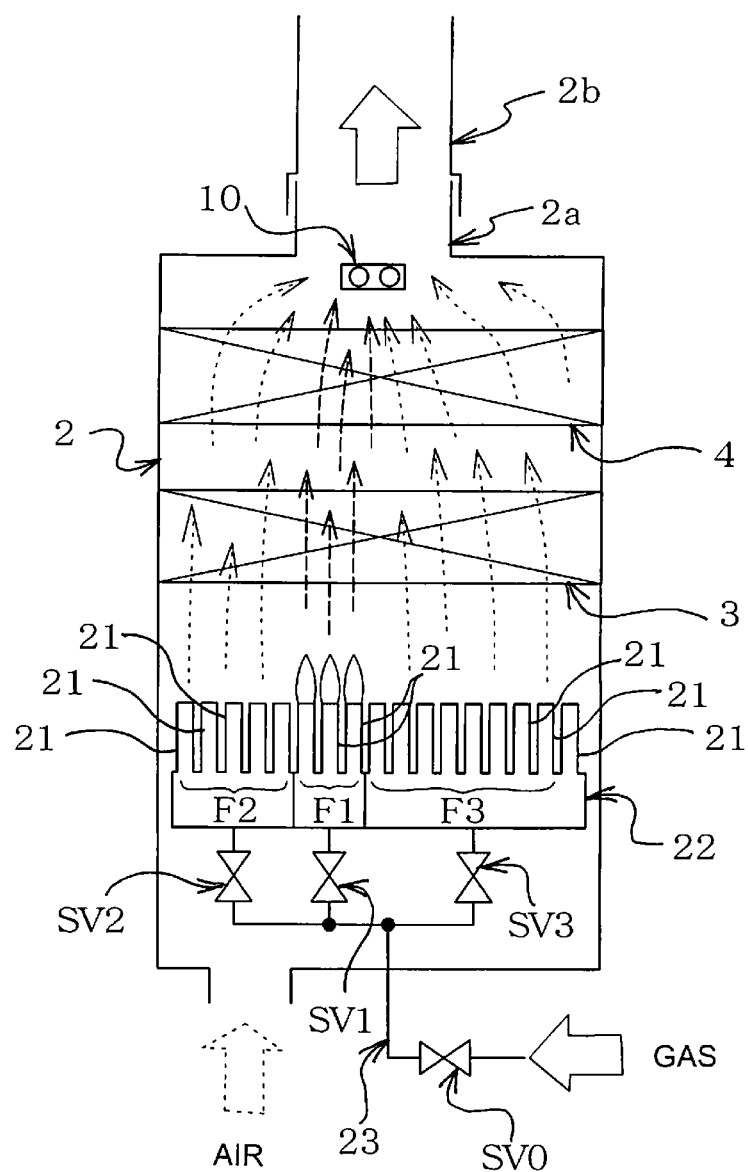
FIG. 3 is a partial schematic diagram showing in principle the combustion apparatus of FIG. 1.

In the secondary heat exchanger 4, the inlet side thereof is connected in fluid communication with the downstream end of a water input pipe 7 while on the other hand the outlet side is connected in fluid communication with the upstream end of a water input connection pipe 8. In the primary heat exchanger 3, the inlet side thereof is connected in fluid communication with the downstream end of the water input connection pipe 8 while on the other hand the outlet side is connected in fluid communication with the upstream end of a hot water output pipe 9. As a result of such arrangement, water supplied to the upstream end of the water input pipe 7 enters the secondary heat exchanger 4 through the water input pipe 7, and the water preheated by latent heat recovered in the secondary heat exchanger 4 is fed through the water input connection pipe 8 to the primary heat exchanger 3, and then hot water heated up to a set temperature in the primary heat exchanger 3 is supplied through the hot water output pipe 9 to hot water faucets in the kitchen, the washroom or the like. In addition, reference numeral 12 in FIG. 3 is a neutralization process tank, and this neutralization process tank is configured such that combustion exhaust drain of strong acidity, produced by condensation of water vapor present in the burned combustion exhaust at the time of latent heat recovery in the secondary heat exchanger 4, is discharged after neutralization process.

The combustion heating section 5 as described above is configured such that its combustion capacity is switchable to any of a plurality of combustion capacity levels, whereby the amount of combustion can be changed and regulated by changing/switching of the combustion capacity. More specifically, the combustion heating section 5 is provided with a plurality of combustion burners 21, 21, . . . (17 combustion burners in total in the example shown in the figure) which are arranged in parallel from one horizontal end to the other horizontal end in the lower position of the combustor casing 2. These combustion burners 21, 21, . . . are separated into groups each composed of a predetermined number of combustion burners. And, each group composed of a respective predetermined number of combustion burners 21, 21, . . . is individually supplied with fuel gas whereby to effect burning thereof. This provides a plurality of combustion areas. For example, the three of the combustion burners 21 situated at the middle in the horizontal direction together constitute a first combustion area F1 (see also FIG. 3); the five of the combustion burners 21 situated on the left-hand side together constitute a second combustion area F2; and the nine of the combustion burners 21 situated on the right-hand side together constitute a third combustion area F3. And, each of the combustion burners 21 is in connection with a gas manifold 22 which is partitioned into sections assigned respectively to the combustion areas F1, F2, F3. Therefore, when both a gas cock solenoid valve SV0 and a gas supply proportional control valve SVL are placed in the open position, the flow of fuel gas from a gas supply pipe 23 is selectively supplied through first to third capacity control switching valves SV1, SV2, SV3 to each corresponding section of the gas manifold 22. For example, when the capacity control switching valve SV1 is placed in the open position, the first combustion area F1 made up of the three combustion burners 21, 21, 21 is burned. And when the capacity control switching valve SV2 is placed in the open position, the second combustion area F2 made up of the five combustion burners 21, 21, . . . is burned. And when the capacity control switching valve SV3 is placed in the open position, the third combustion area F3 made up of the nine combustion burners 21, 21, . . . is burned.

According to the combustion capacity corresponding to the required amount of heat (i.e., the required heat amount), the controller 11 which is an electronic control device exercises selective on-off switching control on the gas cock solenoid valve SV0 and each of the capacity control switching valves SV1, SV2, SV3. Because of such arrangement, if the on-off controlling of combustion for a corresponding combustion area F1, F2, F3 is selectively exercised, the combustion capacity is gradually continuously changed and switched. In addition, in the present embodiment, the gas supply proportional control valve SVL is disposed in the shared gas supply pipe 23, but alternatively it is possible to get rid of the gas supply proportional control valve SVL and, instead, the capacity control switching valves SV1-SV3 themselves are made to function as a flow rate control valve.

Figure 5:
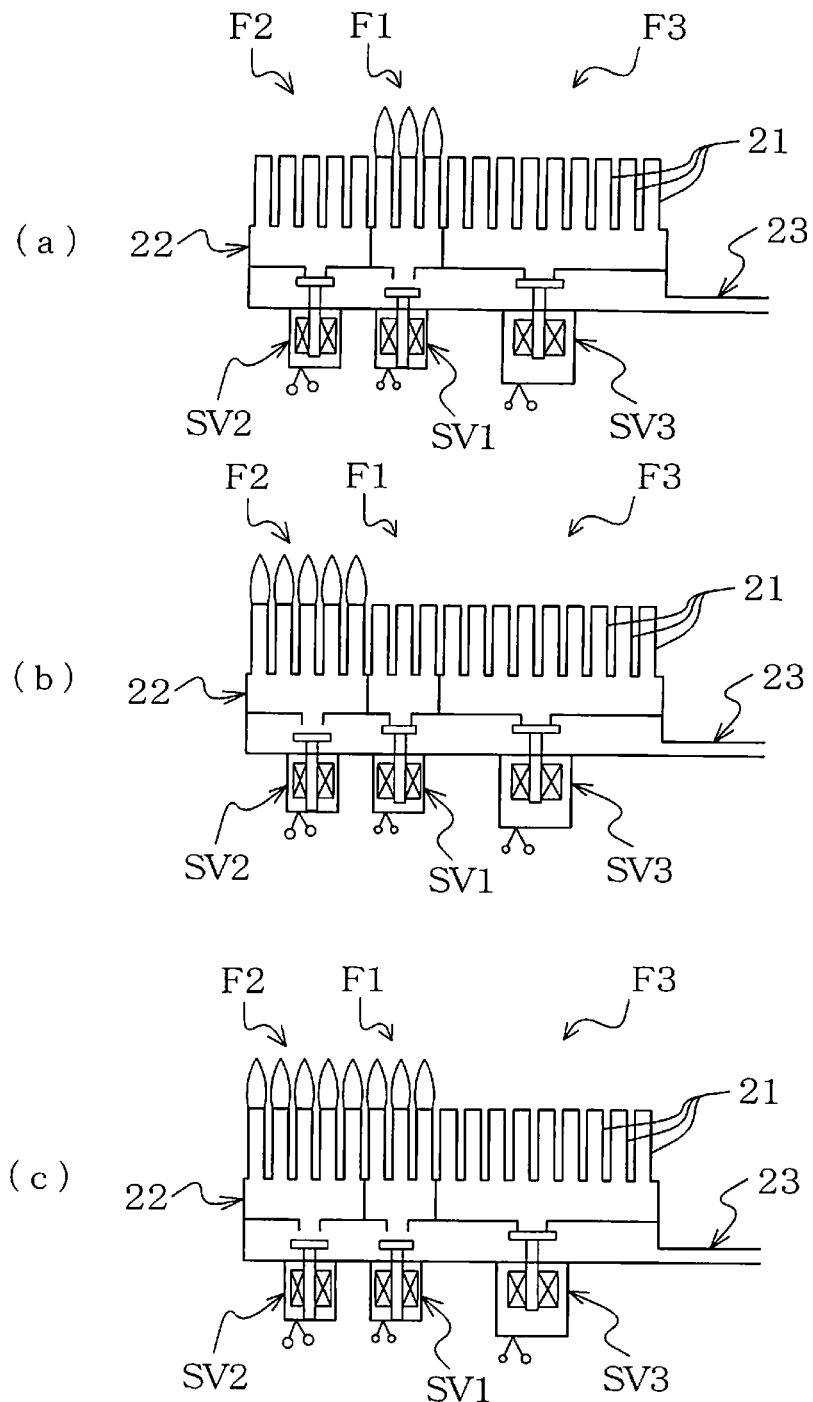
Figure 6:
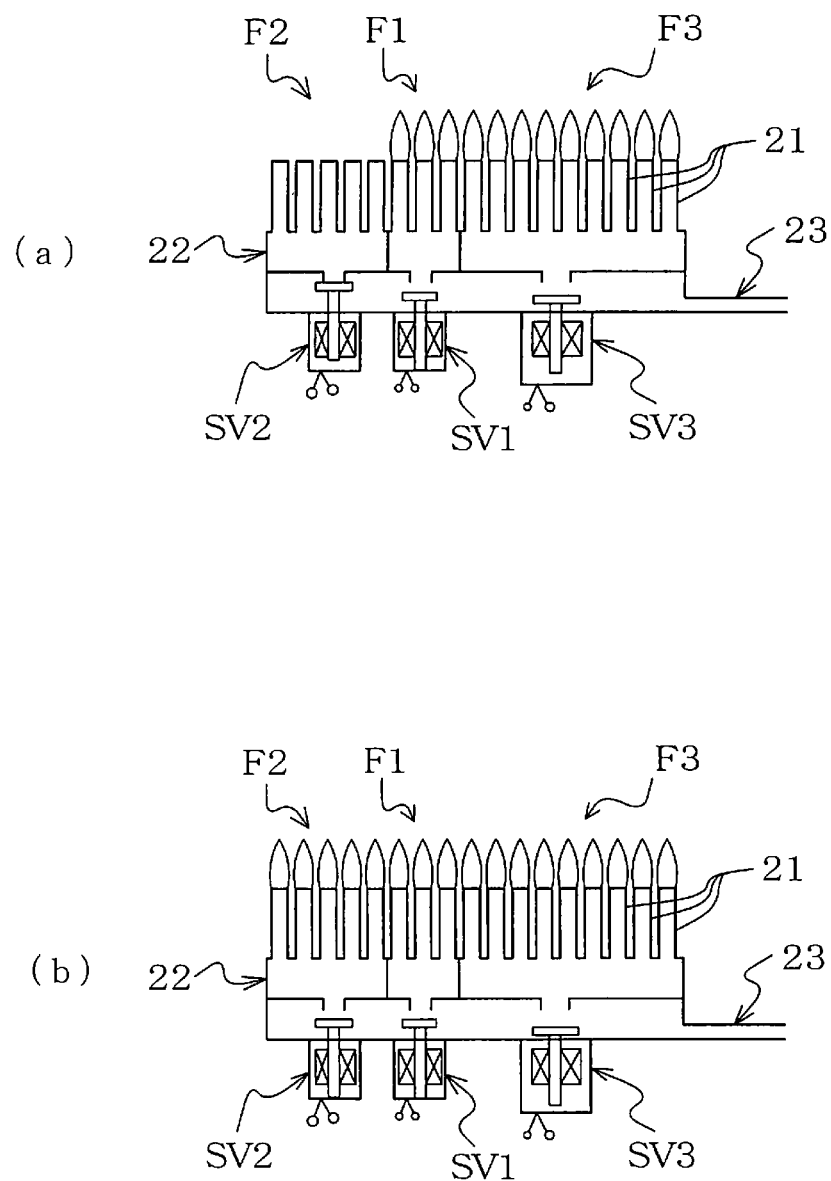

As an example of the selective on-off switching control described above, each combustion area F1-F3 is burned individually or in selective combination with the other as shown, for example, in FIG. 4, whereby the combustion capacity can be switchable to any of five levels (five stages). Stated in another way, by placing only the capacity control switching valve SV1 in the open position so that the first combustion area F1 is burned, it becomes possible to perform a combustion operation at a combustion capacity of Level 1 equivalent to the three combustion burners 21, 21, 21 (see FIG. 5(a)). And by placing only the capacity control switching valve SV2 in the open position so that the second combustion area F2 is burned, it becomes possible to perform a combustion operation at a combustion capacity of Level 2 equivalent to the five combustion burners 21, 21, , , , (see FIG. 5(b)). And by placing the capacity control switching valves SV1, SV2 in the open position so that the first and the second combustion areas F1, F2 are burned, it becomes possible to perform a combustion operation at a combustion capacity of Level 3 equivalent to the eight combustion burners 21, 21, . . . (see FIG. 5(c)). And by placing the capacity control switching valves SV1, SV3 in the open position so that the first and the third combustion areas F1, F3 are burned, it becomes possible to perform a combustion operation at a combustion capacity of Level 4 equivalent to the twelve combustion burners 21, 21, . . . (see FIG. 6(a)). Alternatively, by placing all of the capacity control switching valves SV1, SV2, SV3 in the open position so that the first, the second and the third combustion areas F1, F2, F3 are burned, it becomes possible to perform a combustion operation at a combustion capacity of Level 5 equivalent to the seventeen combustion burners 21, 21, . . . (see FIG. 6(b)).

In the case where the combustion capacity is changed and switched by selective combustion of the different combustion areas F1-F3 as described above, the flow of combustion exhaust and the flow of air are as follows. In other words, the flow of air supplied to under each combustion burner 21 from the blast fan 6 serves as combustion air for each combustion burner 21 belonging to the combustion area F1, the combustion area F2 or the combustion area F3 to be burned. This combustion air changes, when burned, to a combustion exhaust gas and then flows towards the combustion exhaust temperature sensor 10 (for example, see arrows indicated by thick broken line in FIG. 3), but when it passes through a combustion area not burned, it will flow towards the combustion exhaust temperature sensor 10 as unburned air (see arrows indicted by thin dotted line in FIG. 3). This will result in bringing the combustion exhaust temperature sensor 10 into contact with, in addition to combustion exhaust, unburned air, thereby affecting the value of the temperature of combustion exhaust detected by the combustion exhaust temperature sensor 10. Therefore, the combustion exhaust temperature, detected by the combustion exhaust temperature sensor 10 when all of the combustion burners are burned, with the supply gas amount regulated such that the amount of combustion becomes identical with that when only the three combustion burners 21, 21, 21 of the first combustion area F1 are placed in combustion operation, becomes a temperature different from the combustion exhaust temperature detected by the combustion exhaust temperature sensor 10 when only the three combustion burners 21, 21, 21 of the first combustion area F1 are placed in combustion operation. This is caused by the flow of unburned air described above.

To cope with this, it is arranged that the controller 11 of the present embodiment employs, as a combustion exhaust judgment temperature for high-temperature abnormality judgment which is used in a combustion exhaust temperature inhibitory control operation executed based on the monitoring of the temperature of combustion exhaust, not a single judgment temperature but different judgment temperatures that are set respectively for the combustion capacity levels. Referring now to FIG. 4, there is illustrated an example that prevents the outer exhaust stack 2b from exposition to combustion exhaust of high temperature above 80 degrees centigrade. As shown in the example of FIG. 4, the combustion condition at the combustion capacity of Level 1 uses a judgment temperature of 78 degrees centigrade. The combustion condition at the combustion capacity of Level 2 uses a judgment temperature of 74 degrees centigrade. The combustion condition at the combustion capacity of Level 3 uses a judgment temperature of 76 degrees centigrade. And the combustion condition at the combustion capacity of Level 4 uses a judgment temperature of 76 degrees centigrade. And the combustion condition at the combustion capacity of Level 5 uses a judgment temperature of 72 degrees centigrade. These various judgment temperatures can be determined by a comparative test of comparing the temperature of the outer exhaust stack 2b itself with the temperature of combustion exhaust detected by the combustion exhaust temperature sensor 10 in the combustion conditions of from the combustion capacity of Level 1 to the combustion capacity of Level 5.

And, the monitoring of the temperature of combustion exhaust detected by the combustion exhaust temperature sensor 10 is conducted by combustion exhaust temperature inhibitory control, and if the detected combustion exhaust temperature goes beyond the judgment temperature corresponding to a current combustion capacity level, then a safety process is carried out in order to prevent the outer exhaust stack 2b from degradation in thermal durability. There are several safety processes that are performed by combustion exhaust temperature inhibitory control. For example, the user is informed of an event that there is occurring a high-temperature abnormality state of the combustion exhaust temperature being in excess of a predetermined temperature or is informed of, in addition to such an event, a countermeasure to be taken, for example, through a remote controller 13. Alternatively, in addition to such notification, there is carried out a process that forcibly stops the combustion of the combustion apparatus and the user is then informed that combustion has been forcibly brought to a stop since the combustion apparatus entered into a state of high-temperature abnormality as described above. This ensures that the outer exhaust stack 2b is prevented without fail from degradation in thermal durability. And, even when the outer exhaust stack 2b is formed using a pipe of synthetic resin such as heat resistant vinyl chloride, it is ensured that the thermal durability of the outer exhaust stack 2b is maintained without fail. In addition, the controller 11 constituting a control means is formed by a microcomputer equipped with a micro processing unit, memory and other components. In addition, the selective on-off switching control operation executed by the combustion capacity switching means and the combustion exhaust temperature inhibitory control operation executed by the safety control means are each performed by execution of predetermined programs written and stored in the controller 11.

The combustion exhaust temperature inhibitory control of the present embodiment is aimed to prevent the outer exhaust stack 2b from undergoing degradation in thermal durability when the outer exhaust stack 2b is formed of a pipe of synthetic resin such as heat resistant vinyl chloride, other than which it is also possible to monitor and prevent the occurrence of a combustion abnormality by combustion exhaust temperature inhibitory control. In other words, since usually the temperature of combustion exhaust after passage through the secondary heat exchanger 4 decreases to a considerable extent, the excess of the temperature of combustion exhaust above the judgment temperature means that there is occurring some combustion abnormality, and it is possible to decide that the combustion exhaust temperature is being in a state of high-temperature abnormality. Therefore, the executing of a combustion exhaust temperature inhibitory control operation makes it possible to not only prevent the outer exhaust stack 2b from undergoing degradation in thermal durability but also monitor and prevent the occurrence of a combustion abnormality.

Additionally, in addition to the aforesaid direct operation/working-effects, it is possible to obtain the following operation/working-effects. In other words, as has been described above, the different judgment temperatures that are set respectively for the combustion capacity levels are employed as a judgment temperature for high-temperature abnormality judgment used in the combustion exhaust temperature inhibitory control, whereby it becomes possible to realize combustion exhaust temperature inhibitory control that is made more suitable for an actual condition between the installation position of the combustion exhaust temperature sensor 10 (i.e., the installation situation) and the combustion state for each combustion level. Therefore, the heating-up of water to a predetermined temperature is accomplished more quickly, in comparison with the case where comparison with a detected combustion exhaust temperature is made using a single judgment temperature whereby to perform, without regard to the combustion condition at any one of the combustion capacity levels, a safety process to uniformly forcibly reduce the amount of combustion (i.e., the input gas amount) whenever the detected combustion exhaust temperature is in excess of the single judgment temperature. To sum up, if a single judgment temperature is used for any of the combustion capacity levels, this will delay heating-up of water to a predetermined temperature due to the process that forcibly reduces the amount of gas to be supplied although actually there are no problems with still maintaining a current combustion state from the point of view of the protection of the outer exhaust stack 2b, but according to the present embodiment, such delay can be avoided. Alternatively, in the case where, instead of forcible reduction in the amount of gas to be supplied, combustion is forcibly stopped upon excess of the detected combustion exhaust temperature above the single judgment temperature, this will result in making an erroneous judgment that the state has entered into a state of requiring that combustion has to forcibly be stopped although actually there are no problems with still maintaining a current combustion state, as described above, but in accordance with the present embodiment, it becomes possible to avoid and prevent such an erroneous judgment from being made.

Furthermore, without having to dispose the combustion exhaust temperature sensor 10 directly to the outer exhaust stack 2b which is an original target for protection, it is possible to know, by means of calculation, test or the like, the correlation between the temperature of combustion exhaust detected by the combustion exhaust temperature sensor 10 disposed in the exhaust stack 2a of the combustor casing 2 and the heat due to the influence of combustion exhaust which will extend to the outer exhaust stack 2b at the time of detection of the temperature of combustion exhaust. And, based on this, there is set a judgment temperature with respect to the temperature of combustion exhaust detected by the combustion exhaust temperature sensor 10, whereby it becomes possible to monitor the condition of the temperature of combustion exhaust in contact with the outer exhaust stack 2b as a target for protection with the aid of the combustion exhaust temperature sensor 10 disposed in a different location, i.e., in the exhaust stack 2a, from the outer exhaust stack 2b to be protected. This makes it possible to adequately protect the outer exhaust stack 2b.

Other Embodiments

It should be noted that the present invention is not limited to the foregoing embodiment and therefore includes other various embodiments. That is, the number of combustion areas (three combustion areas) or the number of combustion area types in the foregoing embodiment, the number of combustion burners 21 constituting each combustion area, the number of combustion capacity levels (five combustion capacity levels) and so on are just examples and there is no need to say that any other values other than these can also be set.

In the foregoing embodiment, the description has been given in regard to the case where judgment temperatures used for high-temperature abnormality judgment are set respectively for combustion capacity levels. However, furthermore, since the amount of combustion can be changed and regulated by changing and regulating of the amount of gas to be supplied in a combustion condition even at the same combustion capacity level, it may be arranged that the judgment temperature at the amount of gas to be supplied which is set by default at the same combustion capacity level is changed and set in response to the change, if made, in the amount of combustion. That is, if the amount of combustion differs even when the combustion capacity level is the same, the judgment temperature may also be made to differ. For example, in the case where the judgment temperatures are initially set, respectively, for the combustion capacity levels as shown in FIG. 4, it may be arranged that, in response to the change in the amount of combustion (i.e., the amount of gas to be supplied), the judgment temperature thereof is automatically changed and set. Alternatively, it may be arranged that there is prepared a map that represents a plurality of judgment temperatures found by gradually changing and setting the judgment temperatures initially set respectively for the combustion capacity levels according the changeable range of the amount of combustion, and the map thus prepared is pre-stored.

In the foregoing embodiment, there is shown a combustion apparatus configured in the form of a latent heat recovery type water heater, which, however, should not be considered as limitations. That is, the present invention can be applied to any type of combustion apparatus as long as it is configured such that the combustion capacity can be changed and switched to any of a plurality of combustion capacity levels by selective combustion of a plurality of combustion areas, and that the temperature of combustion exhaust is monitored whereby to perform a safety process by making comparison with judgment temperatures corresponding respectively to the combustion capacity levels.

What is claimed is:

1. A combustion apparatus comprising a plurality of independently-controllable combustion areas, each comprising a single combustion burner or a plurality of combustion burners arranged in parallel, whereby the combustion capacity of said combustion apparatus is capable of being changed to any of a plurality of combustion capacity levels by selective combustion of at least one of said multiple combustion areas, wherein said combustion apparatus is configured in the form of a latent heat recovery type water heater equipped with a latent heat recovery heat exchanger for recovery of latent heat from combustion exhaust after flowing through a sensible heat recovery heat exchanger for sensible heat recover;

wherein said combustion apparatus is provided with (a) an exhaust stack therethrough for passage of post-latent heat recovery combustion exhaust past said latent heat recovery heat exchanger, said exhaust stack being connected, by in-situ mounting, to an outer exhaust stack formed as a separate body from said exhaust stack and not composing said combustion apparatus, (b) a combustion exhaust temperature sensor for detecting the temperature of the post-latent heat recovery combustion exhaust past said latent heat recovery heat exchanger, disposed in said exhaust stack and (c) a control means for monitoring of the temperature of combustion exhaust detected by said combustion exhaust temperature sensor and for performing a safety process for preventing said outer exhaust stack from degradation in thermal durability if the detected combustion exhaust temperature exceeds a specific judgment temperature for high-temperature abnormality judgment; and wherein said control means is provided with range of judgment temperatures that are set so as to correspond respectively to multiple combustion capacity levels, whereby said safety process is performed based on the specific judgment temperature corresponding to a current combustion capacity level.

* * * * *